United States Patent [19]

Keresztes

[11] 4,314,596
[45] Feb. 9, 1982

[54] RETENTION DEVICE FOR CAPTURING A SPENT THERMAL FUSE

[75] Inventor: Robert J. Keresztes, South Bend, Ind.

[73] Assignee: The Bendix Corporation, Southfield, Mich.

[21] Appl. No.: 73,973

[22] Filed: Sep. 10, 1979

[51] Int. Cl.$^3$ .............................................. B60C 5/00
[52] U.S. Cl. ............................... 152/330 R; 116/217;
137/74; 137/516.11; 137/853; 244/103 R
[58] Field of Search .................. 152/151, 153, 330 R,
152/DIG. 13, 427–430; 301/5 R, 5 VH, 96, 97;
138/89.2–89.4; 137/74, 853, 860, 516.11;
116/217, 218; 244/103 R

[56] References Cited

U.S. PATENT DOCUMENTS

| Re. 26,137 | 1/1967 | Stanton | 301/5 R |
|---|---|---|---|
| 1,326,445 | 12/1919 | Fewlass | 137/853 X |
| 1,386,370 | 8/1921 | Schwimmer | 137/74 X |
| 2,166,277 | 7/1939 | Adams | 137/74 X |
| 2,666,448 | 1/1954 | Garretson et al. | 137/74 X |
| 2,693,197 | 11/1954 | Bickley | 138/89.4 X |
| 3,384,113 | 5/1968 | Pennisi | 137/853 |
| 3,728,848 | 4/1973 | Vest, Jr. | 138/89.2 X |
| 4,221,231 | 9/1980 | Harvey et al. | 152/427 X |

FOREIGN PATENT DOCUMENTS

| 963392 | 7/1964 | United Kingdom . |
|---|---|---|
| 975559 | 11/1964 | United Kingdom . |
| 1036138 | 7/1966 | United Kingdom . |

Primary Examiner—William A. Powell
Assistant Examiner—Thomas Bokan
Attorney, Agent, or Firm—Leo H. McCormick, Jr.; Ken C. Decker

[57] ABSTRACT

A retainer member is connected to a relief valve attached to a rim of an aircraft tire containing a fluid under pressure. The relief valve has a core made of a fusible material which is responsive to a predetermined temperature that causes the fusible material to change from a solid to a liquid. The pressure of the fluid in the tire causes the fluid to be expelled from the relief valve and thereafter allow fluid to escape from the tire to prevent damaging the tire through a pressure resulting from the predetermined temperature. The retainer member captures the core material to prevent injuring any person on the expulsion of the liquid from the relief valve.

1 Claim, 1 Drawing Figure

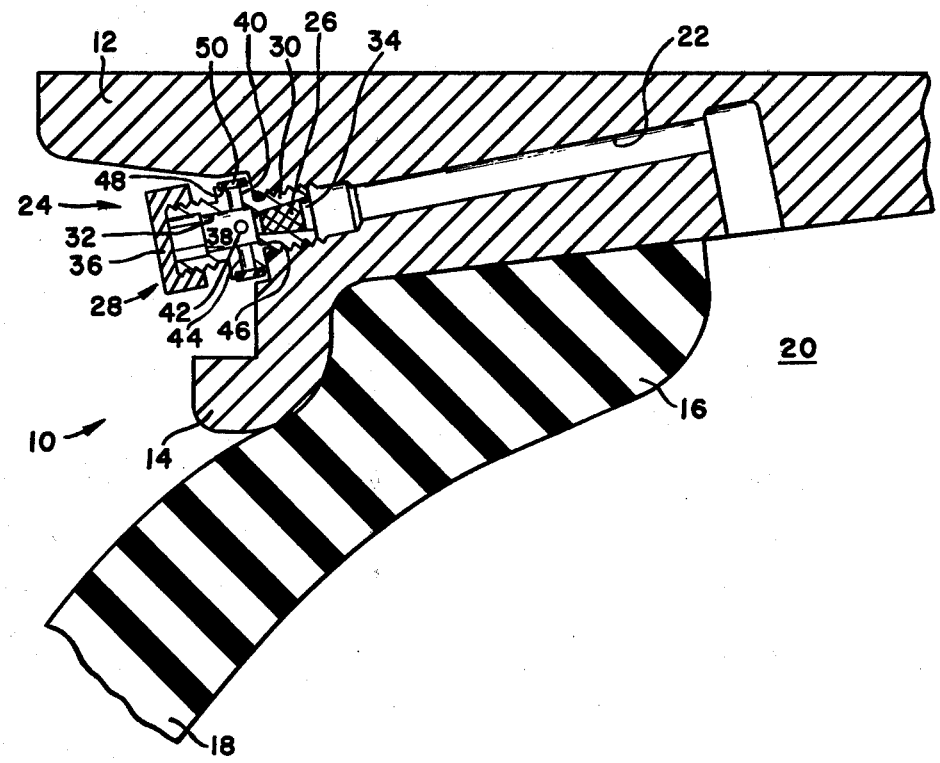

RETENTION DEVICE FOR CAPTURING A SPENT THERMAL FUSE

BACKGROUND OF THE INVENTION

This invention relates to an improvement in thermal fuse plugs used in an aircraft wheel and tire combination to relieve the pressure in the tire when a predetermined safe temperature has been exceeded.

The use of thermal fuse plugs in aircraft wheels as an overtemperature protection device to eliminate the hazard of exploding tires has been disclosed in U.S. Pat. No. Re. 26,137. Such thermal fuse plugs have been accepted as standard safety equipment for use on most aircraft.

It has been observed that the release of a thermal fuse normally does not occur until about 10 minutes after excessive use of the brakes of the aircraft. If such use occurs during landing, the airplane most often would be parked in the deplaning area. Because of the required position of the thermal fuse plugs on the wheels of some aircraft, it has been observed that ground personnel could be injured when the fuse is expelled.

SUMMARY OF THE INVENTION

I have devised a retention member which is connected to the housing of the thermal fuse plug attached to an aircraft wheel. The retention member captures the fuse and thereby prevents injury to any person or damage to property resulting from the expulsion of a liquified plug.

The retention member has a cylindrical body that is fixed to the housing that retains the thermal fuse plug. An endcap is attached to the cylindrical body to establish a retention chamber within the cylindrical body. The retention chamber has a series of vent openings adjacent the thermal fuse plug housing. Thereafter whenever the temperature of the aircraft wheel reaches a predetermined level, the thermal fuse plug changes from a solid to a liquid and the pressure of the fluid in the tire attached to the wheel forces the liquified fuse plug into the retention chamber to permit some of the fluid to escape to the surrounding environment through the vent openings. Thus, damage to the wheel and tire combination from excessive pressure resulting from temperature is prevented and injury to any person resulting from being hit by the liquified thermal fuse is avoided.

It is an advantageous effect of this invention of providing a thermal fuse plug arrangement with a retention member for capturing the fuse plug on expulsion from a vessel and thereby reduce the possibility of injuring any person by being hit with a liquified fuse plug.

It is another advantageous effect of this invention to provide a thermal fuse plug with a resilient band that covers a series of vent openings in a retention chamber in which the fuse plug is retained to prevent contamination of the vent openings and thus assure an unobstructed flow path for fluid from a vessel to the surrounding environment on release of the fuse plug.

These and other objects should be apparent from reading this specification and viewing the drawing.

BRIEF DESCRIPTION OF THE DRAWING

The FIGURE is a sectional view of a section of the rim of an aircraft wheel and tire combination with a thermal fuse plug made according to the principles of this invention connected thereto.

DETAILED DESCRIPTION OF THE INVENTION

The drawing illustrates a sectional view of a portion of an aircraft wheel and tire combination 10. A bead 16 on tire 18 engages rib 14 on rim 12 to establish a seal between chamber 20 and the surrounding environment. The rim 12 has a series of passages 22, only one is shown, which connect chamber 20 with the surrounding environment.

A relief valve 24 having a thermal fuse plug 26 made of a fusible material of the type fully disclosed in U.S. Pat. No. Re. 26,137 is located in passage 22 to control the communication of fluid between chamber 20 and the surrounding environment.

A retention device has a housing 28 that extends from the housing 30 of the thermal fuse plug 26. A bore 32 in housing 28 is aligned with the conical bore 34 in housing 30 that retains the thermal fuse plug 26. An endcap 36 is attached to the end of housing 28 to establish a retention chamber 38. The retention chamber 38 is connected to the surrounding environment through a series of vent openings 40, 42, and 44 located adjacent to the shoulder 46 that separates bore 32 from conical bore 34.

Housing 28 which normally has a cylindrical shape has an annular groove 48 located over the vent openings 40, 42 and 44. A resilient band 50 is located in groove 48 to prevent contaimnants from blocking the vent openings 40, 42 and 44.

MODE OF OPERATION OF THE INVENTION

As disclosed in U.S. Pat. No. Re. 26,137 during a brake application the thermal energy generated can exceed the safe operational temperature for the tire of an aircraft. For most tires when the temperature of the operational environment reaches 300° F. a tire inflated to 210 psig at 65° F. has an internal pressure of about 268 psig. Most tire manufacturers state that a blowout or failure of an inflated tire is impending when the internal fluid pressure is above 304 psig at 390° F. The thermal fuse 26 which is selected from a variety of eutectic compositions of the type disclosed in U.S. Pat. No. Re. 26,137 changes from a solid to a liquid below 390° F.

When the thermal fuse plug 26 changes from a solid to a liquid, the pressure of the fluid in chamber 20 forces the liquified composition from conical bore 34 into retention chamber 38 to allow a portion of the fluid to escape to the surrounding environment by flowing through vent openings 40, 42 and 44 and past the resilient band 50. The force of the fluid in chamber 20 deposits the liquified fuse plug 26 into the chamber area adjacent end cap 36 where it is retaind. The pressure of the fluid in passage 22 acts on and expands band 50 to allow fluid to escape from chamber 20 by flowing through the vent opening. As the fluid escapes to the surrounding environment, the internal pressure is correspondingly reduced sufficiently to prevent a blow-out or failure of the tire. Since the liquified eutectic composition of plug 26 is captured in chamber 38, possible injury to any person close to the wheel and tire caused by being hit on expulsion of the plug from conical bore 34 is also avoided.

When the thermal fuse plug 26 has been expelled from conical bore 34, it is necessary to install a new fuse plug to seal conical bore 34. Endcap 36 is removed from housing 28 and the used fuse plug removed from chamber 38 to re-establish the operational condition of the relief valve 24 shown in the drawing.

I claim:

1. In an aircraft wheel having a rim with a tire attached thereto to define a pressure chamber for a fluid, and a relief valve connected to the pressure chamber through a passage in the rim, said relief valve having a core member made of a fusible alloy located in a conical bore connected to said passage, the core member responding to a predetermined temperature by changing shape and being expelled from the relief valve by the pressure of the fluid in the pressure chamber to thereafter allow fluid to escape through the passage and conical bore and thereby prevent damaging the tire from a predetermined pressure resulting from the predetermined temperature, the improvement comprising:

a cylindrical projection extending from the relief valve having a cylindrical bore aligned with the core member and vent holes for connecting the cylindrical bore with the surrounding environment, said vent holes being located adjacent a shoulder that separates said cylindrical bore from the conical bore, said cylindrical projection having a groove on its peripheral surface, said vent holes terminating in said groove;

a resilient band located in said groove to cover the vent holes to prevent contaminants from entering the cylindrical bore; and an end cap attached to said cylindrical projection to establish a retention chamber in said cylindrical bore, said core member on being expelled from the relief valve being retained in said retention chamber adjacent said end cap to prevent injuring any person or damaging any property resulting from the expulsion of the core from the relief valve, said fluid in the chamber thereafter flowing from the passage through the vent holes to the surrounding environment by expanding the resilient band over the vent holes to reduce the fluid pressure in the pessure chamber.

* * * * *